United States Patent [19]

Yoshida

[11] Patent Number: 5,795,224

[45] Date of Patent: Aug. 18, 1998

[54] SHOOTING UNIT SUPPORT DEVICE AND GAME DEVICE HAVING SHOOTING UNIT

[75] Inventor: Yusuke Yoshida, Tokyo, Japan

[73] Assignee: Sega Enterprises, Ltd., Tokyo, Japan

[21] Appl. No.: 617,694

[22] Filed: Mar. 19, 1996

[30] Foreign Application Priority Data

Mar. 20, 1995 [JP] Japan .................. 7-61349

[51] Int. Cl.⁶ .................................. A63F 9/22
[52] U.S. Cl. .................. 463/2; 463/5; 463/46; 463/51
[58] Field of Search .................. 463/1, 2, 5, 48, 463/49, 51–53; 364/410, 411; 434/16, 19–22

[56] References Cited

U.S. PATENT DOCUMENTS

| | | | |
|---|---|---|---|
| 2,449,030 | 9/1948 | Wilsey | 463/53 |
| 3,990,704 | 11/1976 | Meyer et al. | 463/52 |
| 4,099,719 | 7/1978 | Dean et al. | 463/5 |
| 4,175,748 | 11/1979 | Yokoi | 463/52 |
| 4,268,036 | 5/1981 | Yokoi | 463/53 |
| 4,285,523 | 8/1981 | Lemelson | 463/5 |
| 4,616,833 | 10/1986 | Geller | 463/51 |
| 4,895,376 | 1/1990 | Shiung-Fei | 463/2 |
| 4,976,438 | 12/1990 | Tashiro et al. | 463/46 |
| 5,127,657 | 7/1992 | Ikezawa et al. | 463/5 |
| 5,190,286 | 3/1993 | Watanabe et al. | 463/5 |

*Primary Examiner*—Jessica Harrison
*Assistant Examiner*—Mark A. Sager
*Attorney, Agent, or Firm*—Dickstein Shapiro Morin & Oshinsky

[57] ABSTRACT

A shooting unit support device permits a shooting unit to be repositioned freely with respect to a game display unit, and can detect a displacement position of the shooting unit. A game device using the shooting unit support device enables a player to attack enemies while avoiding attack by the enemies by repositioning the shooting unit with respect to game images, whereby the game play is made realistic and does not take much time to destroy enemies. The shooting unit comprises a support 17 which supports a gun 14 used in a game device 10 opposed to an image display device 12 of the game device 10, an interconnection member 18 and a support rod 19 which permit the support 17 to be moved to reposition a gun 14 relative to the image display device, and a variable resistor 20 which detect a replacing position of the support 17.

7 Claims, 12 Drawing Sheets

PRIOR ART

SHOOTING UNIT SUPPORT DEVICE AND GAME DEVICE HAVING SHOOTING UNIT

BACKGROUND OF THE INVENTION

The present invention relates to a shooting unit supporting device for supporting a shooting unit used in a game device, and a game device for playing a game in which objects in picture images displayed on a screen of the game device are shot by the shooting unit supported by the shooting unit support device.

Games using guns, such as shooting games in which targets are shot by guns, battle games in which enemies are fought with guns, have been conventionally known as popular games. Especially large-scale game devices which use imitation guns duplicating real guns have an important place in game centers.

A game device using an imitation gun comprises an imitation gun to be operated by a game player, a game control unit which forms game images to be watched through the imitation gun, and a game display unit which displays game pictures formed by the game control unit. On the game display unit, a background and game images containing enemies are displayed opposed to the imitation gun.

As shown in FIG. 12, the imitation gun 1 is mounted on a support 3 projected from an operation panel 2 of the game device body (not shown), and a muzzle 5 on the top of the support 3 can be pointed in different directions upward and downward, and left and right on the swing portion 4 as a pivot. In accordance with the direction of the muzzle 5, a gun site 7 is displayed on a screen 6 positioned ahead of the muzzle 5.

In playing a game, a player aims the muzzle 5 at an enemy appearing on the screen and operates to fire. The enemy can be destroyed by registering a direction of the muzzle 5 striking on a position of the enemy. Concurrently, the enemy on the screen 6 attacks the player by firing bullets. The enemy's bullets are shot in the background of the screen toward the player operating the imitation gun 1, and when the enemy's bullets approach the player within a certain distance, the bullets are judged to have hit the player.

The muzzle 5 of the imitation gun 1, however, can only be swung on the pivot to be pointed in a different direction. The position of the imitation gun 1 with respect to the screen 6, i.e., the position of a player is stationary. The only way for defense against attack from the enemy is to shoot down the enemy's bullets themselves fired toward the player.

Accordingly the player can take no action other than the defense mentioned above, and cannot attack the enemy while defending against the enemy's attack. The game play lacks reality and takes much time to destroy the enemy.

An object of the present invention is to provide a support device for a shooting unit of a game device, which permits the shooting unit to be freely moved with respect to a game display unit, and which can detect displacement positions.

Another object of the present invention is to provide a game device which permits a game player to attack enemies while the game player is avoiding attacks by the enemies by displacing the shooting unit of the game device, whereby the game play is made realistic and does not take as much time to destroy the enemies.

SUMMARY OF THE INVENTION

The object of the present invention is achieved by a shooting unit support device comprising a support unit which supports a shooting unit for use in a game device opposed to a game display unit; a moving unit which moves the support unit to reposition the shooting unit relative to the game display unit; and a position detecting unit which detects a displacement position of the support unit.

The object of the present invention is achieved by a shooting unit support device wherein the moving unit repositions the shooting unit horizontally along the game display unit.

The object of the present invention is achieved by a shooting unit support device wherein the moving unit includes an interconnection member having one end connected turnable to a body of the game device and the other end connected swingable to the support unit.

The object of the present invention is achieved by a shooting unit support device wherein the position detecting unit detects a swing angle of the interconnection member with respect to the game device body.

The object of the present invention is achieved by a game device comprising a shooting unit; a shooting unit support device for supporting the above-described shooting unit; a game control unit which forms a game image to be watched near the shooting unit; a game display unit which displays the game image-to-be-watched formed by the game control unit; and a game image changing unit which changes the game image displayed on the game display device in accordance with a position of the shooting unit detected by a position detecting unit.

The object of the present invention is achieved by a game device wherein the game image changing unit selects a portion of a complete game image corresponding to a full range of repositioning of the shooting unit which (portion) corresponds to a position of the shooting unit.

A shooting unit support device according to the present invention comprises a support unit which supports a shooting unit for use in a device opposed to a game display unit; a moving unit which moves the support unit to reposition the shooing unit relative to the game display unit; and a position detecting unit which detects a displacement position of the support unit, whereby the shooting unit can be arbitrarily moved with respect to the game display unit, and positions of the shooting unit can be detected.

The moving unit moves the support unit so that the shooting unit is repositioned horizontally along the game display unit, whereby the shooting unit can be repositioned arbitrarily horizontally with respect to the game display device.

The moving unit includes the interconnection member having one end connected swingable to a body of the game device and the other end connected turnable to the support unit, whereby the shooting unit can be arbitrarily repositioned together with the support unit through the interconnection member, which is swingable on a rod.

The position detecting unit detects a swing angle of the interconnection member with respect to the body of the game device, whereby a displacement position of the shooting unit can be detected based on the swing angle.

The game device according to the present invention comprises a shooting unit; a shooting unit support device for supporting the above-described shooting unit; a game control unit which forms a game image to be watched near the shooting unit; a game display unit which displays the game image-to-be-watched formed by the game control unit; and a game image changing unit which changes the game image displayed on the game display device in accordance with a position of the shooting unit detected by a position detecting unit, whereby a player can attack enemies while avoiding attack of the enemies by repositioning the shooting unit with respect to a game image, which makes the game realistic and decreases time required to destroy enemies.

The game image changing unit selects a portion of a complete game image corresponding to a full range of repositioning of the shooting unit which (portion) corresponds to a position of the shooting unit, whereby a game image displayed on the game display device can be changed to a portion of a complete game image which is selected corresponding to a displacement position of the shooting unit.

DETAILED DESCRIPTION OF THE INVENTION

The game device according to one embodiment of the present invention will be explained with reference to FIGS. 1 to 11.

Figure 1:
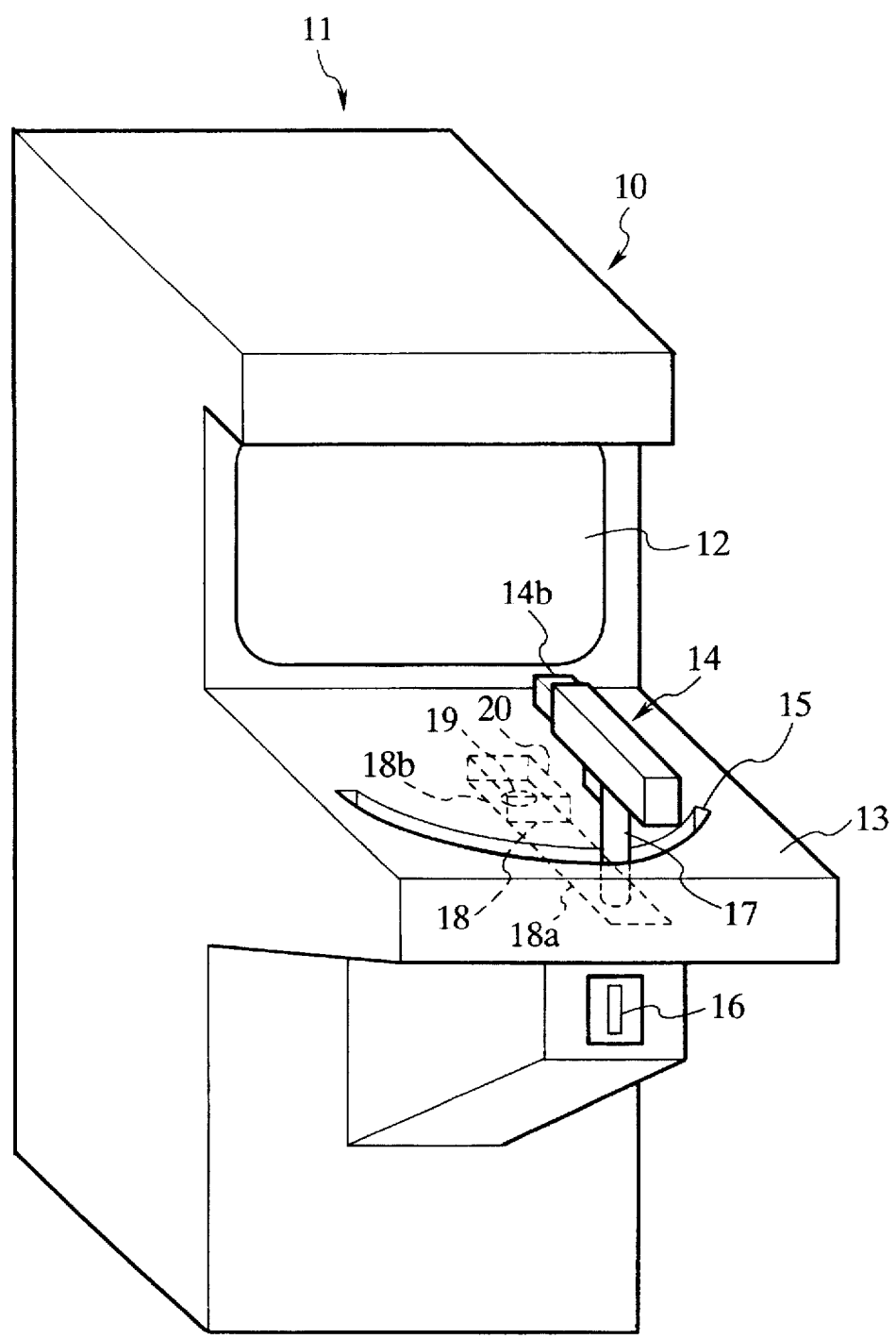
FIG. 1 is a perspective view of an appearance of the game device according to one embodiment of the present invention.

As shown in FIG. 1, the game device 10 has an image display device 12 which is a game display unit on an upper part of the face of the body 11 of the game device. The image display device 12 displays a game image A (see FIGS. 5A to 7B) in accordance with the progress of a game. An operation panel 13 which is operated by a game player is provided before the image display device 12. On the operation panel 13 there is provided a gun 14 which is a shooting unit of the game device 10 according to the present embodiment, and a gun guide groove 15. A game start button, etc., which are not shown, are provided on the operation panel 13. A coin slot 16 into which coins are inserted is provided below the operation panel.

Figure 2:
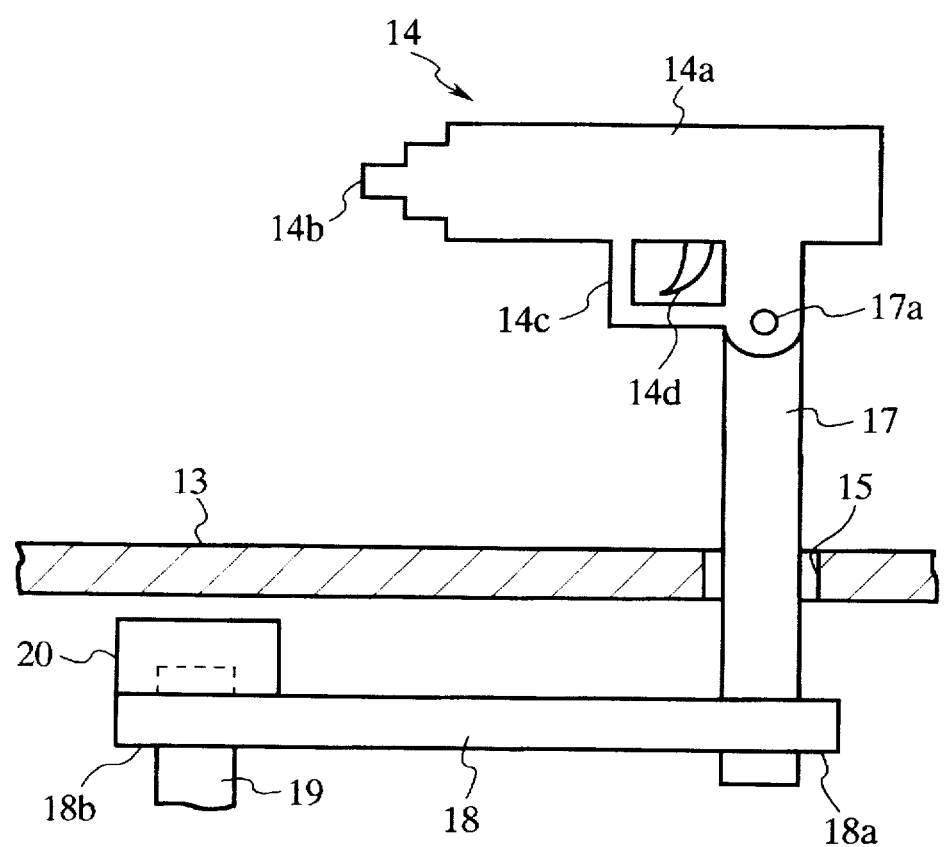
FIG. 2 is a view explaining a gun of the game device according to the embodiment of the present invention.

As shown in FIG. 2, the gun 14 is supported above the operation panel 13 on a support 17 projected vertically through the gun guide groove 15 and is opposed to the image display device 12. The body 14a of the gun 14 is mounted on the upper end of the support 17 so as to be vertically and horizontally swingable with respect to the image display device 12. The gun body 14a is vertically swung on a pin 17a provide in the upper end of the support 17 to thereby freely reposition vertically the muzzle 14b in the forward end of the gun body 14a. On the underside of the gun body 14a near the support 17 there is provided a trigger 14d for firing bullets, which is protected by a guard fixture 14c.

A lower end portion of the support 17, which is located inside the operational panel 13, is received turnably in one end 18a of an interconnection member 18 in the shape of an elongate plate. The other end 18b of the interconnection member 18, which is fixed inside the operation panel 13 of the game device body 11, turnably receives a support rod 19, which is a rod fixed inside the operational panel 13 of the game device body 11. The support rod 19 is located between the gun guide groove 15 and the image display device 12 substantially intermediate a widthwise length of the image display device 12 (see FIG. 1). That is, one end 18a of the interconnection member 18 rotatably carries the support 17, and the other end 18b of the interconnection member 18 is rotatably carried by the game device body 11. It is also possible that the support rod 19 secured to the interconnection member 18 is rotatably carried on the game device body 11.

A variable resistor 20 which detects swing of the interconnection member 18 on the support rod 19 is provided on the support rod 19, which is the pivot of the swing of the interconnection member 18. The variable resistor 20 detects a swing angle of the interconnection member 18 with respect to the game device body 11. That is, the variable resistor 20 detects a displacing position of the support 17.

As shown in FIG. 1, the gun guide groove 15 is formed arcuate to the image display device 12 through the top surface of the operation panel 13. The arc agrees with a trajectory depicted by the support 17 when the interconnection member 18 is swung on the support rod 19.

Figure 3:
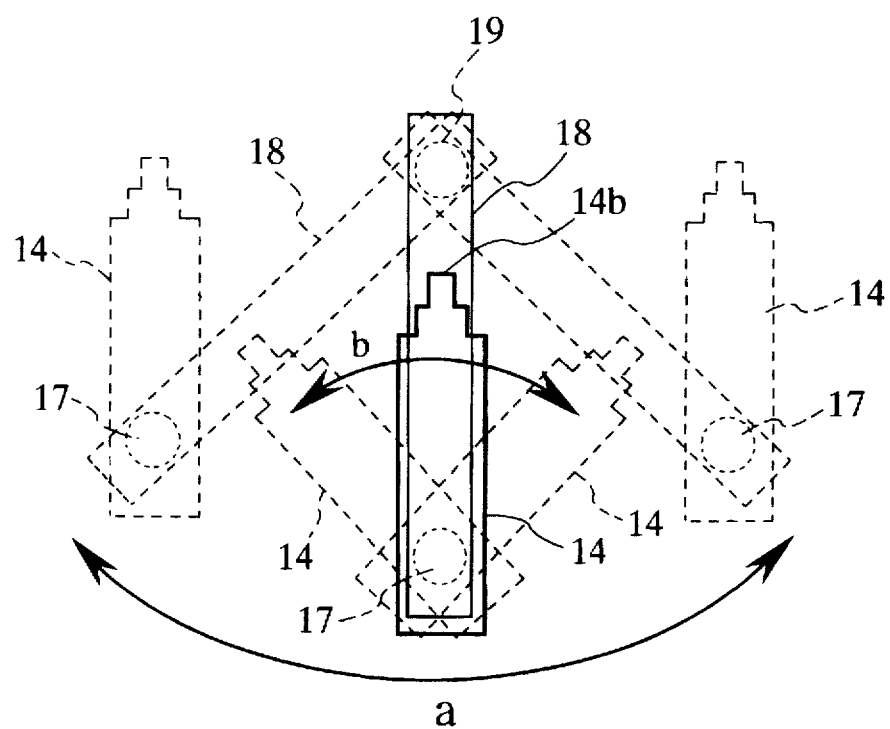
FIG. 3 is a view explaining repositioning of the gun of the game device according to the embodiment of the present invention.

Thus, as shown in FIG. 3, the gun 14 is repositioned together with support 17 arcuately along the gun guide groove 15 (see the arrow a) to be repositioned with respect to the image display device 12. That is, the support 17 is repositioned horizontally along the width of the image display device 12. The gun 14 is accordingly repositioned along the width of the image display device 12. Thus the interconnection member 18 and the support rod 19 function as a moving unit which moves the support 17 so that the gun 14 is repositioned along the width of the image display device 12.

A turn angle of the support 17 with respect to the interconnection member 18, and a swing angle of the interconnection member 18 with respect to the support rod 19 are set at about 90° at maximum.

At an arbitrary displacing position to which the gun is repositioned to, the gun body 14a can be swung horizontally with respect to the top surface of the interconnection member 18 (see FIG. 3, arrow b).

Thus the gun 14 is supported by the gun support device comprising the support 17, the interconnection member 18, the support rod 19 and the variable resistor 20 so as to be repositioned along the width of the image display device 12.

Figure 4:
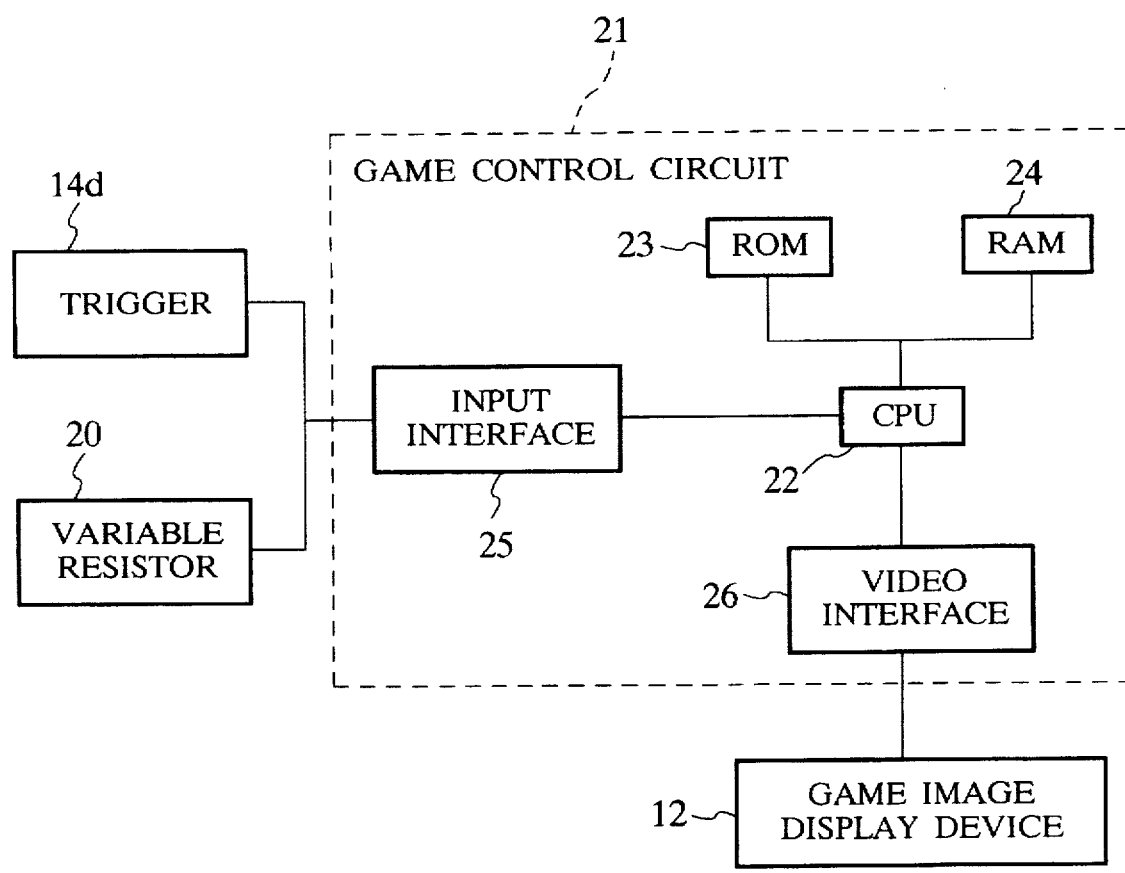
FIG. 4 is a block diagram of the game device according to the embodiment of the present invention.

FIG. 4 shows a block diagram of the game device according to the present embodiment.

A game control circuit 21 which controls the game includes a CPU 22 which generally controls the device. The CPU 22 is connected to a ROM 23 and a RAM 24 which store programs to be executed and various data. The CPU 22 is connected, via an input interface 25, to output means which outputs various operational signals of the gun 14. That is, the trigger 14d of the gun 14 which outputs bullet firing signals, and the variable resistor 20 which outputs swing signals of the interconnection member 18 with respect to the support rod 19. An image display device 12 is connected to the CPU 22 via a video interface 26. The game control circuit 21 forms a game image A which is watched at the gun 14 (see FIGS. 5A to 7B).

When a game is started by the game device 10, the game image A containing a background and enemies therein is displayed.

As shown in FIGS. 5A to 7B, the game image A corresponds to a displacing position of the gun 14 and is a part of a complete game image B, which is selected and displayed corresponding to the displacing position of the gun 14. The complete game image B is a game image which corresponds to a complete range over which the gun 14 can be repositioned. In other words, the complete game image B corresponds to a range of a maximum reposition of the gun 14 and is a conceptional image wider than the game image A actually displayed on the image display device 12. Which portion of the complete game image B to be displayed is determined based on a swing angle of the interconnection member 18 with respect to the support rod 19. A swing angle is detected based on a resistance value of the variable resistor 20 which changes in accordance with a repositioning of the gun 14 and indicates where the gun 14 is located in the gun guide groove 15. The CPU 22 computes, based on a swing angle, a portion of the complete game image B corresponding to the displacing position of the gun 14.

Figure 5A:
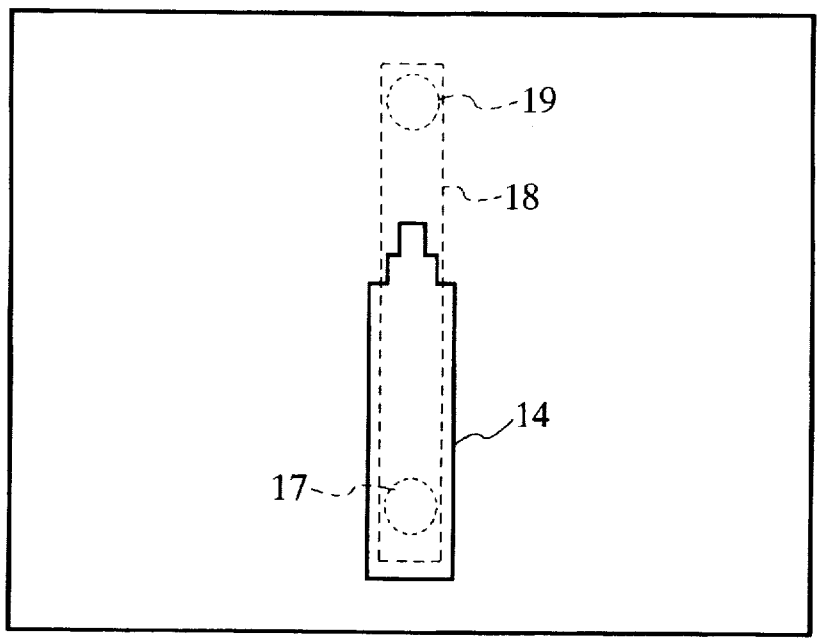
FIGS. 5A and 5B are views explaining game images corresponding to positions of the gun of the game device according to the embodiment of the present invention, in which the gun is located substantially at the middle.
Figure 5B:
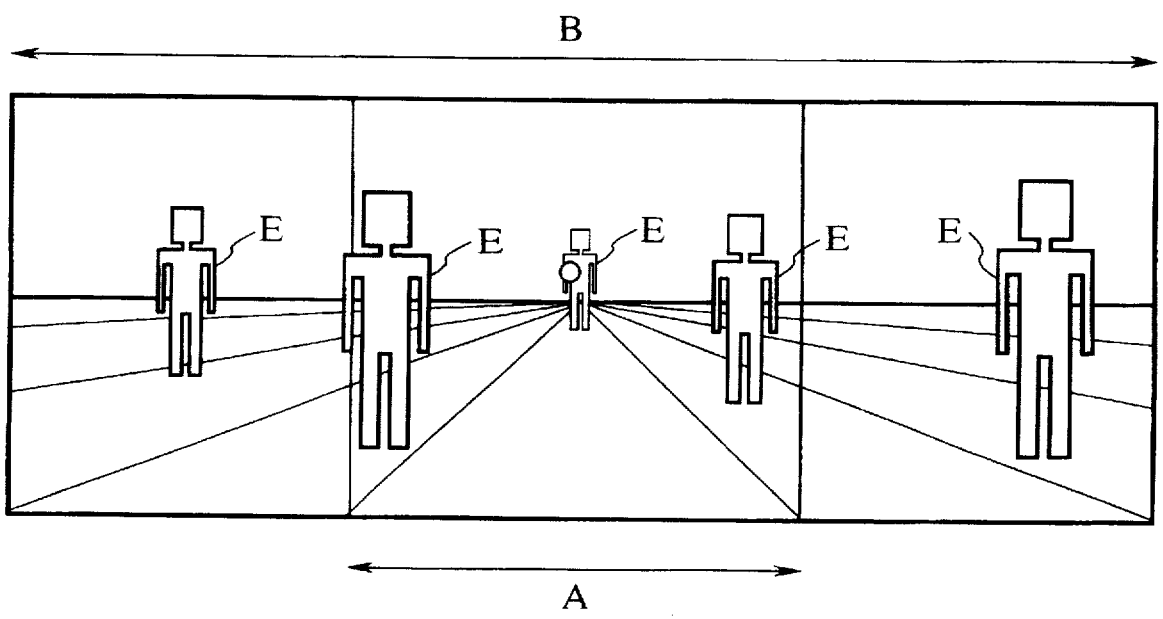

As shown in FIGS. 5A and 5B, when the gun 14 is located substantially at the middle of the gun guide groove 15 (see FIG. 5A), the substantially middle portion of the complete game image B is displayed as the game image A (see FIG. 5B).

Figure 6A:
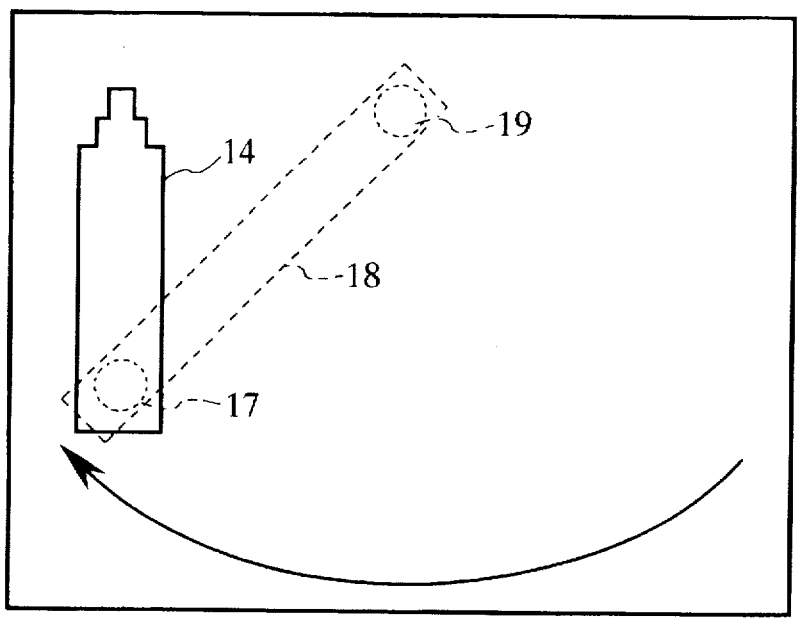
FIGS. 6A and 6B are views explaining game images corresponding to positions of the gun of the game device according to the embodiment of the present invention, in which the gun is located on the left.
Figure 6B:
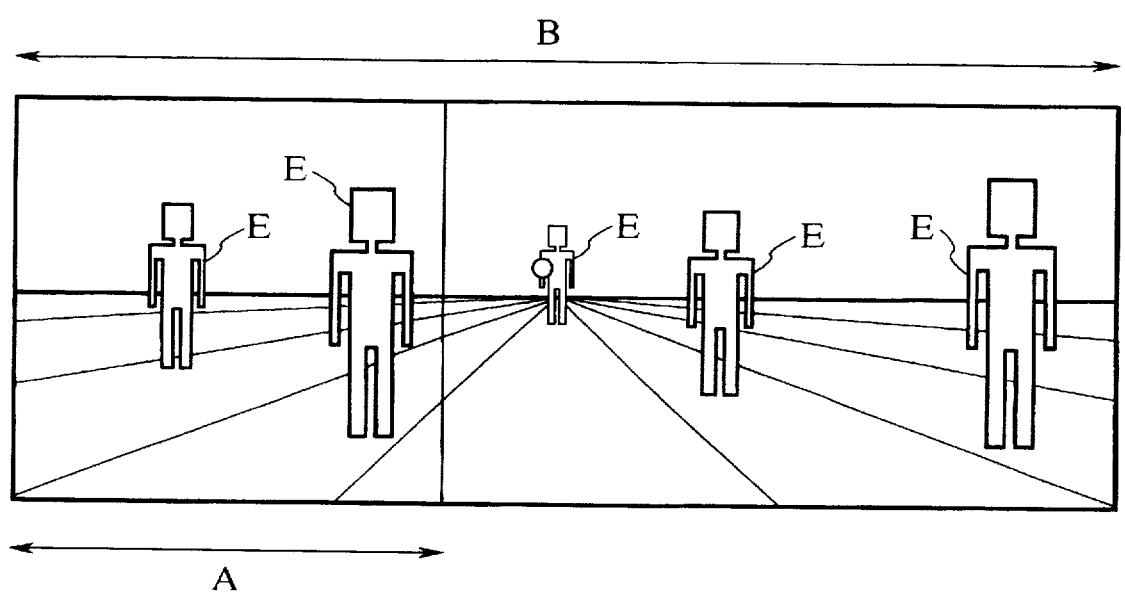

As shown in FIGS. 6A and 6B, when the gun 14 is located at the left most end of the gun guide groove 15 (see FIG. 6A), a left most portion is displayed as the game image A (see FIG. 6B).

Figure 7A:
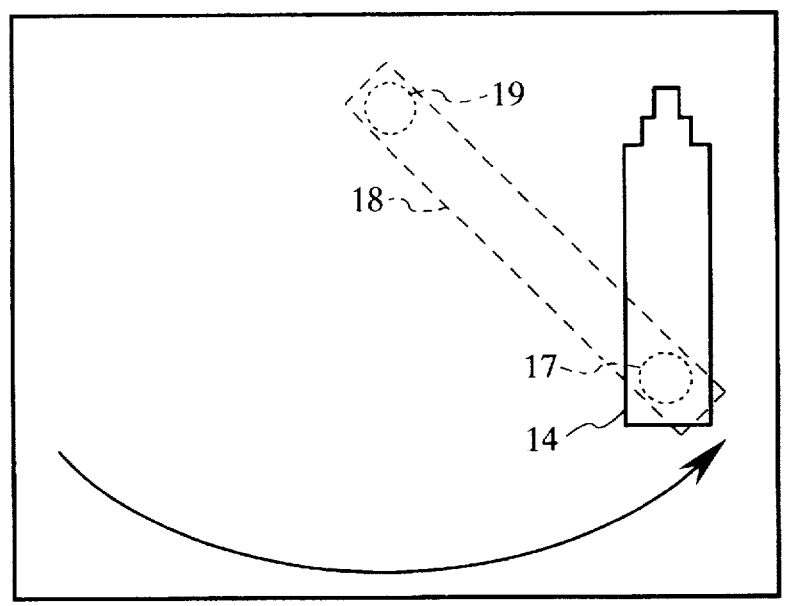
FIGS. 7A and 7B are views explaining game images corresponding to positions of the gun of the game device according to the embodiment of the present invention, in which the gun is located on the right.
Figure 7B:
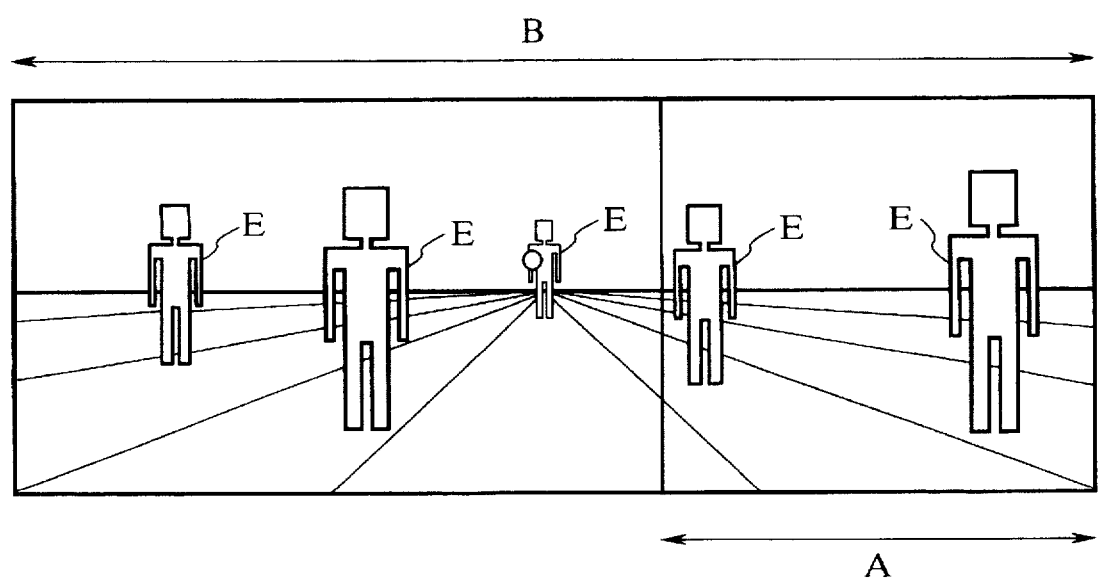

As shown in FIGS. 7A and 7B, when the gun is located at the right most end of the gun guide groove 15 (see FIG. 7A), a right most portion of the complete game image is displayed as the game image A (see FIG. 7B). In FIGS. 5A to 7B, E represents enemies.

Thus, the game image A is arbitrarily selected from the complete game image B extended from the left most end to the right most end, corresponding to a position of the gun 14. Accordingly, the CPU 22 functions as a game image replacing unit which replaces the game image A displayed on the image display device 12 in accordance with a position of the gun 14 detected by the variable resistor 20.

Figure 12:
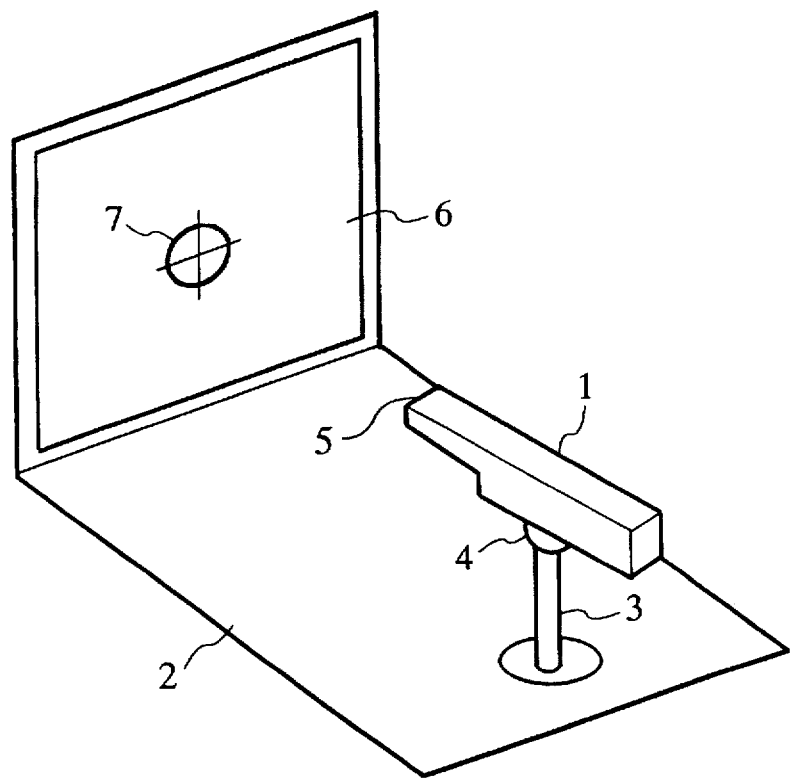
FIG. 12 is a view explaining an imitation gun used in conventional games using guns, and a game image.

The gun 14 can change the angle of the muzzle 14b to aim at an arbitrary position in the game image A. A position at which the muzzle 14 is aimed is displayed on the game image A as a gun site (see FIG. 12). The position of a gun site is determined by photo-detecting means (not shown) provided on the forward end of the gun 14 detecting a horizontal scan line which crosses the target region of the game image A as a scan line detection signal. A position on the game image A where the detection was conducted can be easily computed based on a time at which a scan line detection signal is received corresponding to a start of the perpendicular return line.

Even when the game image A is changed corresponding to repositioning of the gun 14, the position of a gun site is not moved together with the game image A. It is possible, however, that the gun 14 itself is repositioned horizontally simultaneously with vertical repositioning of the muzzle 14, whereby changes of the game image A and movement of the gun site can be simultaneously conducted.

The operation of the game device according to the present embodiment will be explained with reference to FIGS. 8 to 10.

When a person plays a game, the player aims the muzzle 14 at an enemy E on the game image A and makes a firing operation. The enemy E can be destroyed by making a direction of the muzzle 14 agree with a position of the enemy E. Simultaneously therewith, the enemy E on the game image A attacks the player by firing bullets at the player.

Figure 8:
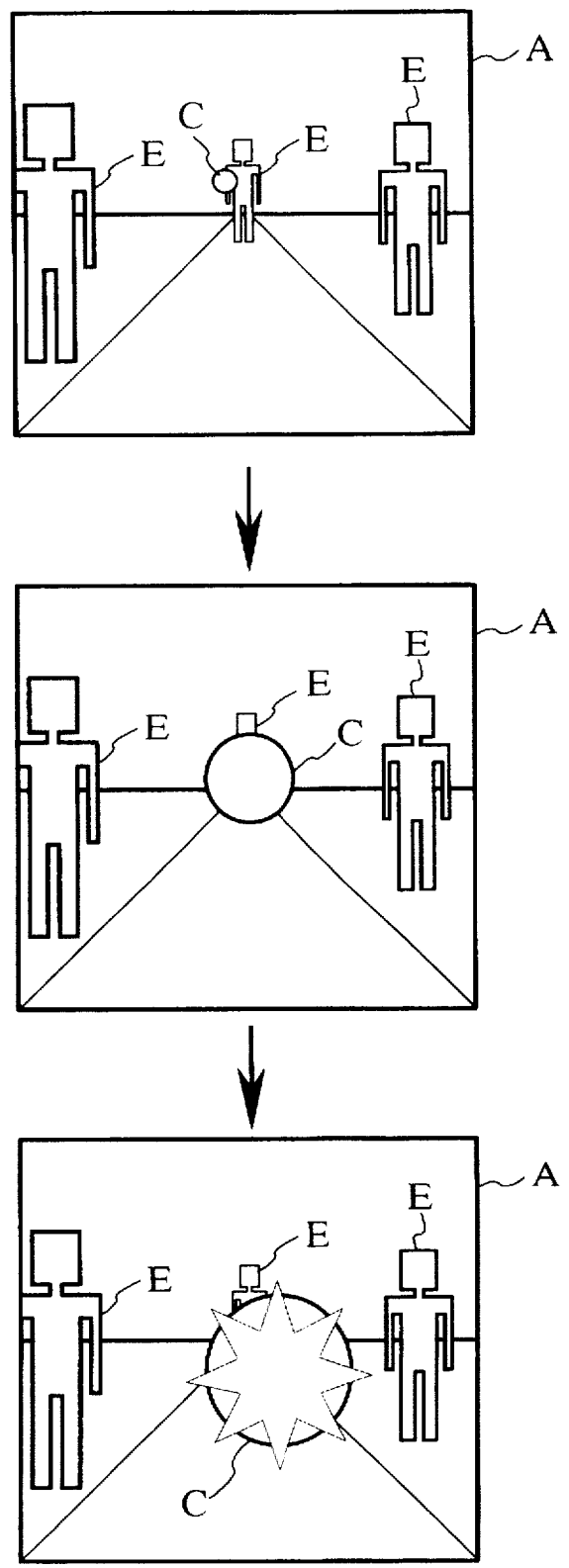
FIG. 8 is views of continuous game images in a case that a bullet hits a player in a game.
Figure 9:
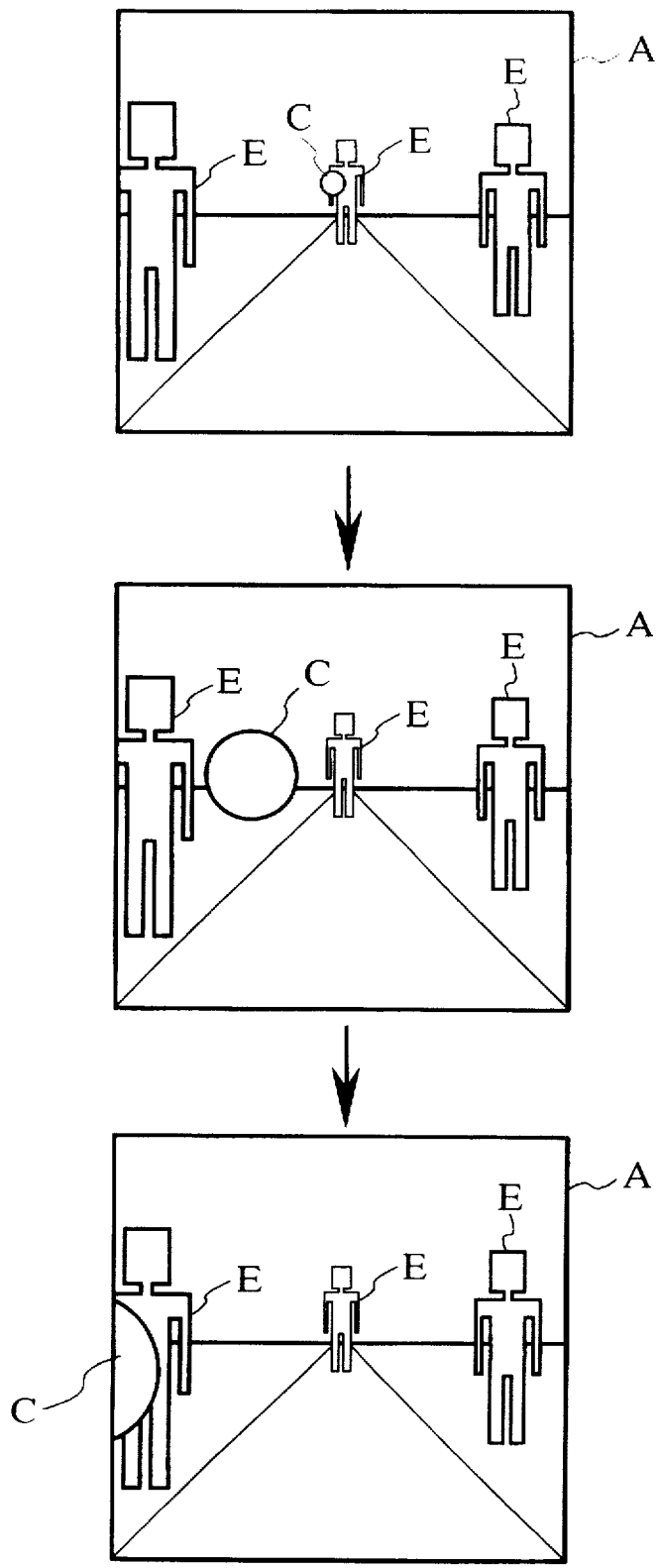
FIG. 9 is views of continuous game images of a case that an enemy's bullet does not hit a player in a game.

As shown in FIG. 8, a bullet C fired by the enemy E comes from the background of the game image A toward the foreground of the game image A, and when the bullet C comes near a position of the player, i.e., a position of the gun 14 by a certain distance, the bullet C is judged to have hit the player. As shown in FIG. 9, however, when the bullet C goes astray out of the game image A, the bullet C is judged to have failed to hit.

Figure 10:
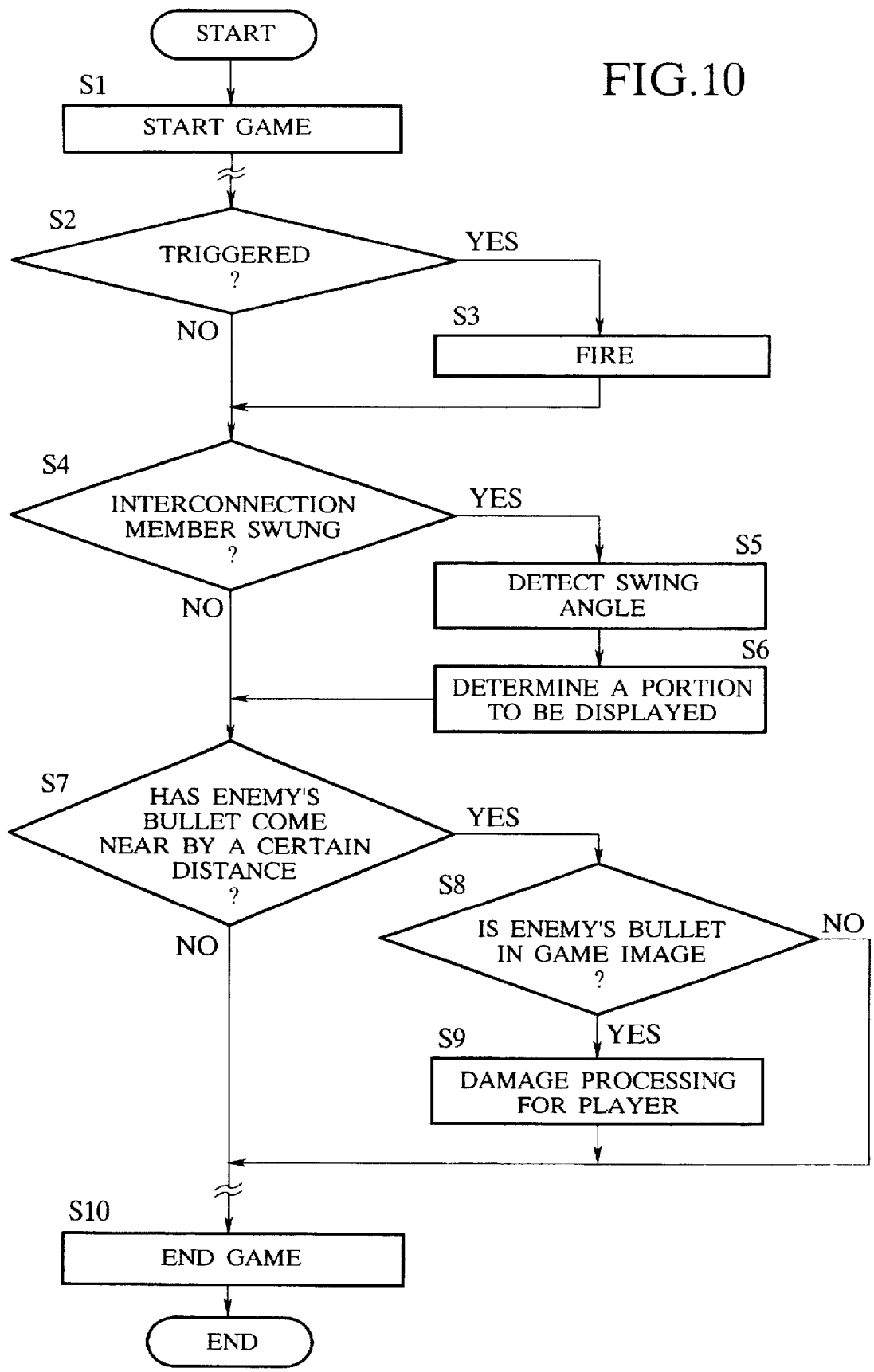
FIG. 10 is a flow chart of a process of a game image change conducted by the game device according to the embodiment of the present invention.

As shown in the flow chart of FIG. 10, first, a game is started (Step 1). A player pushes a game start button (not shown) to start the game, after placing a suitable coin in the coin slot 16. When the game is started, various kinds of processing are conducted in accordance with contents of the game, but here the processing in connection with changes of a game image A which characterize the present embodiment will be explained. The rest of the processing is not explained here.

First, it is judged whether or not the trigger of the gun of an enemy has been pulled (Step S2). When the trigger has been pulled, the gun fires a bullet C. When the bullet C is fired, the bullet C is displayed gradually increasing its size at the firing position (see FIGS. 8 and 9), which makes the bullet C appear like coming toward the gun 14, i.e., the player (Step S3)

When the trigger 14d is not pulled, or after the enemy E fires a bullet C, it is judged whether or not the interconnection member 18 is swung (Step S4). When the interconnection member 18 is swung, a swing angle of the interconnection member 18 is detected (Step S5), and in accordance with the swing angle, a portion of a complete game image B to be displayed is determined (Step S6). A game image A as currently displayed is replaced by the game image A corresponding to the repositioning of the gun 14.

When the interconnecting member 18 is no swung, or when a portion to be displayed has been determined, it is judged whether or not the bullet C of the enemy E comes near the player by a certain distance (Step S7). When the bullet C of the enemy E comes near the player by a certain distance, it is judged whether or not the bullet C of the enemy E is within the game image A (Step S8). When the bullet C of the enemy E is within the game image A, i.e., when the bullet C of the enemy E comes near the player by a certain distance, and, in addition thereto, the bullet C is within the game image A, damage processing for the player being destroyed by the enemy E is conducted (Step S9).

On the other hand, when the bullet C of the enemy E does not come near the player by a certain distance, or when the bullet C of the enemy E goes astray out of the game image A, the damage processing for the player is not conducted. The player can reposition the gun 14 to thereby change the game image A so as not to let the bullet C of the enemy E go out of the game image A.

Figure 11A:
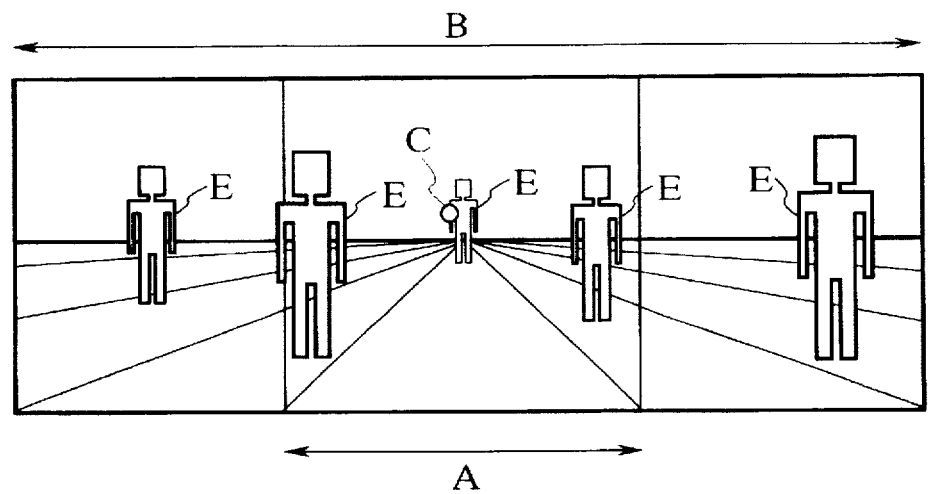
FIGs. 11A to 11C are views of game images of a game played on the game device according to the embodiment of the present invention.
Figure 11B:
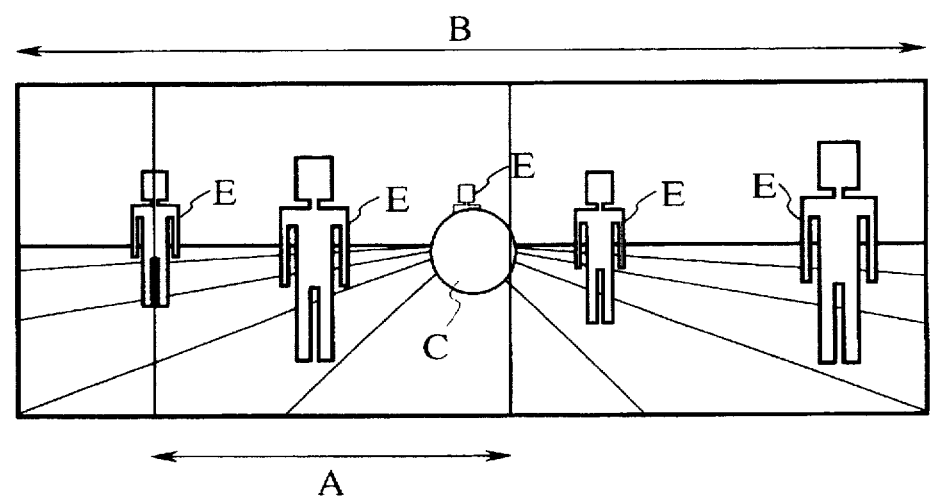
Figure 11C:
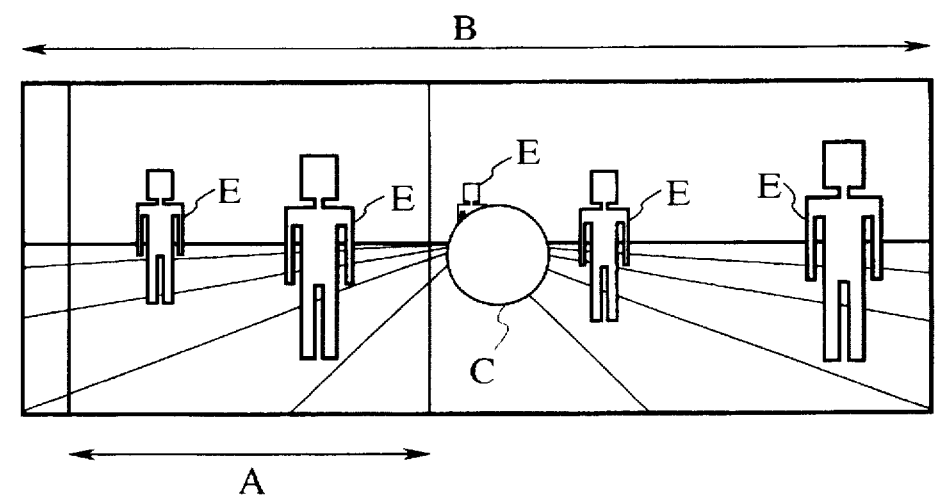

Here, an example of changing the game image A to thereby let a bullet C of an enemy E go out of the game image A is shown in FIGs. 11A to 11C.

A game player operates substantially at the widthwise center of the gun guide groove 15, and an enemy E fires a bullet C. Because the gun 14 is located substantially at the center of the gun guide groove 15, the substantially central portion of a complete game image B is displayed as the game image A. In the game image a small circle indicative of the bullet C at the position of the enemy E on the background of the center of the game image A is displayed, which indicates that the enemy E has fired the bullet C (see FIG. 11A).

When the player sees the enemy E fire the bullet C, the player handles the gun 14 to reposition the gun 14. When the player repositions the gun 14 a little to the left along the gun guide groove 15, the interconnection member 18 is swung on the support rod 19, and a swing angle is detected. Based on the detected swing angle, a portion of the complete game image corresponding to a displacement position is computed. Based on the computed value, a portion of the complete game image which is offset a little to the left is selected and displayed as the game image A (see FIG. 11B). The bullet C advances toward the player while the gun 14 is being repositioned. The circle indicative of the bullet C is positioned on the game image A, gradually increasing its size.

As the player repositions the gun 14 to the left, a portion of the complete game image B which is further offset to the left is selected and displayed as the game image A, and the circle indicative of the bullet C goes astray out of the game image A (see FIG. 11C). The bullet C goes astray out of the game image A, whereby the player has avoided the attack by the enemy E.

In other words, the gun 14 itself is repositioned to change the game image A from the image in which the enemy E fired the bullet C (see FIG. 11A) to a portion of the complete game image B corresponding to the displacement position of the gun 14 (see FIG. 11C), whereby the place that the bullet C is to hit goes astray out of the game image A. That is, when the enemy E fires the bullet C, the player can avoid the enemy's attack by repositioning the gun 14 from a position where the bullet C has been fired to another position. The game image A can be changed by moving the gun 14 horizontally left or right along the complete game image B.

The change of the game image A made by repositioning the gun 14, and the movement of the gun site are independent of each other. Even when the game image A is changed, the position of the gun site itself in the game image A is never changed, which makes it possible to continuously aim at a prescribed enemy E, changing the game image A. Thus the player can continue to attack the enemy E while being attacked by the enemy E, avoiding the enemy's attack by repositioning the gun 14.

Subsequently, various kinds of processing are conducted in accordance with contents of the game. The player destroys all the enemies E, and wins the game, or the player does not destroy the enemies within a set period of time or is destroyed by an enemy E, and loses the game. Then the game is over (Step S10).

As described above, the player repositions the gun 14 to thereby change the game image A independently of collimation and firing of the gun 14 to avoid the enemy's bullets C. Addition of the new action "avoid enemy's bullets" adds strategic and imaginary realistic factors to the game operation of simply shooting the gun 14. That is, motions of the gun 14 handled by a player, i.e., the motions and movement of the body of the player are reflected in the games as strategic and realistic factors.

As a result, the defect in the conventional games using guns, normally "enemies cannot be attacked during defense" can be solved, and it does not take much time to destroy enemies, which speedily progresses the games.

Furthermore, a game operation of attacking enemies while avoiding attack from the enemies is possible, which make game play more realistic.

The present invention is not limited to the above described embodiment and covers other variations and modifications.

For example, the gun body 14a mounted on the top end of the support is made horizontally swingable with respect to the image display device 12 in addition to vertically thereto, whereby the support need not be turnable with respect to the interconnection member 18.

The gun guide groove 15, which is formed arcuate to the image display deice 12, may be formed, for example, parallel with the image display device 12. The shape of the gun guide groove 15 may be any that allows the gun 14 to be displaced along the width of the image display device 12.

Swings of the interconnection member 18 on the support rod 19, which are detected by the variable resistor 22, may be detected by analog detection means which detects swing angles as does the variable resistor 22, or detecting means which digitally detects swing angles.

What is claimed is:

1. A shooting game device comprising:
   a game display unit which displays a background image and a target image;
   a shooting unit with a muzzle positioned with respect to said display unit;
   a support unit which movably supports said shooting unit so as to allow a player to pivotally move the shooting unit;
   a moving unit which allows a player to move the support unit in a generally parallel direction relative to the game display unit;
   a position detecting unit which detects a positional displacement of the support unit; and
   display control means for scrolling the background image with the target image laterally in response to the detected displacement of said support unit.

2. A shooting game device according to claim 1, wherein the moving unit includes an interconnection member having one end connected pivotally to a pivotal axis provided in the game device and the other end to which the support unit is connected so that said support unit swivels around said pivotal axis thereby to allow a player to move said support unit in the parallel direction relative to the game display unit.

3. A shooting game device according to claim 2, wherein the position detection unit detects an angular movement of the interconnection member with respect to said pivotal axis of the game device.

4. A game device comprising:

a shooting unit with a muzzle;

a support member which movably supports the shooting unit so as to allow a game player to pivotally manipulate said shooting unit;

a game control unit which generates a game image;

a game display unit which displays part of the generated game image, said shooting unit being disposed so that its muzzle opposes said game display unit;

a movable member connected to said support member, said movable member being arranged to allow a game player to give said support member a manual movement including a generally parallel movement relative to said game display unit; and a position detecting unit which detects a positional displacement of said support member caused by a game player in a direction parallel to said game display unit;

said game control unit further comprising means for scrolling the game image so as to change part of the game image displayed on the game display unit in accordance with the positional displacement of the support member detected by said position detection unit.

5. A game device comprising:

a display unit with a display monitor screen;

a shooting unit;

a support member which pivotally supports the shooting unit so as to allow a game player to adjust the muzzle of said shooting unit to aim an enemy character displayed on said display unit;

a game control unit which generates a game image including a background image and an enemy character to display, said background image being larger than an image area to be displayed on said display said background image being larger than an image area to be displayed on said display monitor screen;

a movable member connected to said support member said movable member being arranged to allow a game player to manipulate said support member to move in a direction generally parallel relative to said display monitor screen; and a position detection means which detects a positional displacement of said support member in a direction parallel to said display monitor screen;

said game control unit scrolling an image area to be displayed on said monitor screen in response to the positional displacement detected by said position detection unit.

6. A game device of claim 5 wherein said game control unit comprises means for generating and for controlling to display on said monitor screen an image indicative of a bullet shot from an image of an enemy character and means for judging the bullet to have failed to hit when the image of the bullet is moved out of sight on said display monitor screen in response to the positional displacement detected by said position detection unit.

7. A game device of claim 5 wherein the movable member includes an arm member with one end connected pivotally to a pivotal axis provided in the game device and the other end with which the support member is connected so as to allow said support member to swivel around said pivotal axis thereby to allow a game screen player to give said support member a manual movement including a movement in the parallel direction relative to the display monitor.

* * * * *